United States Patent
Kang

(10) Patent No.: US 10,432,625 B2
(45) Date of Patent: Oct. 1, 2019

(54) ALLOWING BEACON DEVICE TO ACCESS MESH NETWORK USING AUTHENTICATION KEY

(71) Applicant: SK Planet Co., Ltd., Gyeonggi-do (KR)

(72) Inventor: Kichon Kang, Seoul (KR)

(73) Assignee: SK Planet Co., Ltd., Seongnam-si, Gyeonggi-do (KR)

( * ) Notice: Subject to any disclaimer, the term of this patent is extended or adjusted under 35 U.S.C. 154(b) by 165 days.

(21) Appl. No.: 15/335,090

(22) Filed: Oct. 26, 2016

(65) Prior Publication Data

US 2017/0126678 A1    May 4, 2017

(30) Foreign Application Priority Data

Oct. 28, 2015    (KR) .................... 10-2015-0149845

(51) Int. Cl.
| | | |
|---|---|---|
| H04L 29/06 | (2006.01) | |
| H04W 12/06 | (2009.01) | |
| H04W 4/02 | (2018.01) | |
| H04W 12/08 | (2009.01) | |
| H04W 84/18 | (2009.01) | |
| H04W 4/021 | (2018.01) | |
| H04W 4/80 | (2018.01) | |

(52) U.S. Cl.
CPC ........... *H04L 63/0876* (2013.01); *H04W 4/02* (2013.01); *H04W 12/06* (2013.01); *H04W 4/021* (2013.01); *H04W 4/80* (2018.02); *H04W 12/08* (2013.01); *H04W 84/18* (2013.01)

(58) Field of Classification Search
CPC .............................. H04L 63/0876; H04W 4/02

USPC ............................................................ 726/6
See application file for complete search history.

(56) References Cited

U.S. PATENT DOCUMENTS

| | | | | |
|---|---|---|---|---|
| 5,661,806 A | * | 8/1997 | Nevoux ............... | H04L 9/0844 380/247 |
| 8,844,007 B2 | * | 9/2014 | Vicente ................ | A61B 5/002 726/6 |
| 2004/0019800 A1 | * | 1/2004 | Tatebayashi .......... | G06F 21/10 726/17 |
| 2005/0113070 A1 | * | 5/2005 | Okabe ................. | H04W 12/06 455/411 |
| 2006/0251257 A1 | * | 11/2006 | Haverinen ............ | H04L 63/06 380/270 |
| 2007/0079374 A1 | * | 4/2007 | Yasui .................... | G06F 21/84 726/22 |
| 2008/0114650 A1 | * | 5/2008 | Ku ........................ | G06Q 30/02 705/14.23 |

(Continued)

FOREIGN PATENT DOCUMENTS

KR    10-0927534 B1    11/2009

*Primary Examiner* — Haresh N Patel
(74) *Attorney, Agent, or Firm* — Fenwick & West LLP

(57) ABSTRACT

The present invention relates to an authentication apparatus and method for a wireless network among a plurality of beacon devices constituting a mesh network and a computer-readable recording medium storing a program for carrying out the method, and more particularly, to an authentication apparatus and method according to authentication technology for including only beacon devices installed at a particular location in a particular mesh network and a recording medium storing a computer program for carrying out the method.

12 Claims, 7 Drawing Sheets

(56) References Cited

U.S. PATENT DOCUMENTS

| | | | |
|---|---|---|---|
| 2009/0024848 A1* | 1/2009 | Takasugi | H04L 9/3236 |
| | | | 713/169 |
| 2009/0068988 A1* | 3/2009 | Cofta | H04L 63/0853 |
| | | | 455/411 |
| 2011/0145579 A1* | 6/2011 | Shin | H04L 9/0844 |
| | | | 713/169 |
| 2013/0143529 A1* | 6/2013 | Leppanen | H04W 4/08 |
| | | | 455/411 |
| 2014/0317707 A1* | 10/2014 | Kim | H04W 12/04 |
| | | | 726/6 |
| 2015/0350189 A1* | 12/2015 | Shin | H04W 12/06 |
| | | | 726/29 |
| 2015/0372875 A1* | 12/2015 | Turon | H04W 76/10 |
| | | | 370/254 |
| 2016/0142402 A1* | 5/2016 | Kim | H04L 63/08 |
| | | | 726/4 |
| 2017/0150411 A1* | 5/2017 | Zhong | H04L 29/06 |
| | | | 726/6 |
| 2018/0019878 A1* | 1/2018 | Jiang | H04L 9/32 |
| | | | 726/4 |

* cited by examiner

ALLOWING BEACON DEVICE TO ACCESS MESH NETWORK USING AUTHENTICATION KEY

CROSS-REFERENCE TO RELATED APPLICATION

This application claims priority to and the benefit of Korean Patent Application No. 10-2015-0149845 filed in the Korean Intellectual Property Office on Oct. 28, 2015, the entire contents of which are incorporated herein by reference.

TECHNICAL FIELD

The present invention relates to an authentication apparatus and method for a wireless network among a plurality of beacon devices constituting a mesh network and a computer-readable recording medium storing a program for carrying out the method, and more particularly, to an authentication apparatus and method for a wireless mesh network which may limit access to the wireless mesh network based on the location of a beacon device and a recording medium storing a computer program for carrying out the method.

BACKGROUND

Descriptions made in this section merely provide background information of embodiments of the present invention and do not constitute conventional art.

In general, a wireless network has a point-to-point topology or a star, that is, point-to-multipoint, topology, but a wireless network which has a mesh, that is, multipoint-to-multipoint, structure like a wired network has been attracting attention recently.

A wireless mesh network may be easily extended without connection to a wired network and has resultant merits in flexibility and extendability, such as speed and economic efficiency in network establishment, redundancy based on multiple paths, and so on.

In an existing wired network environment, a signal is connected through a repeater or a wireless router referred to as an access point (AP), and all APs are connected in a wired manner.

On the other hand, in a mesh network, wireless communication routers which will serve as antennas like existing wireless communication base stations (BSs) become mesh nodes and wirelessly connect all sections as long as a representative AP is connected in a wired manner. In this way, the structure of a wired mesh network may also be implemented in a wireless network. Thus, a mesh network has which overcomes a limitation of an existing wireless local area network (WLAN) has appeared.

Also, with the development of mobile communication networks and specifications of terminals, a mobile communication terminal has gone beyond the existing scope of a simple communication device or information providing device and become a necessary possession of contemporary people and is evolving into a total entertainment device.

Further, technologies for performing short-range wireless communication between mobile communication terminals close to each other are rapidly developing, and one of the short-range wireless communication technologies is Bluetooth communication.

Bluetooth communication has evolved again and again, and the Bluetooth low energy (BLE) technology (Bluetooth 4.0) is widely being used in smart phones, retail geofencing, mobile payment, and so on. The BLE technology consumes less power than a standard Bluetooth wireless connection.

Also, there is ongoing development of a service method for providing various types of information to a mobile communication terminal of a user through a beacon which uses Bluetooth communication, and cases of constructing a mesh network with a beacon device which uses Bluetooth communication are increasing.

It is possible to access such a wireless mesh network after authentication using only authentication information, such as an authentication key, required to form the mesh network. Accordingly, an unnecessary beacon device may be included in the mesh network, and a security problem and an unexpected service traffic problem may occur.

Consequently, an efficient authentication method for a mesh network in which beacon devices are used is required to set a range of beacon devices wanted by an administrator and determine whether or not a beacon device may access the mesh network.

CITATION LIST

Patent Literature

Korean Patent No. 10-0927534, registered on Nov. 11, 2009 (title: System and Method for Providing a Connection in a Communication Network)

SUMMARY

The present invention is directed to solve the above described problems by allowing only beacon devices within a particular range to join the corresponding mesh network using location information, and providing an efficient network management and authentication method accordingly.

More specifically, the present invention is directed to providing an authentication apparatus and method for a wireless mesh network wherein a certain spatial range is set as a criterion for forming a mesh network, and only beacon devices within the range are allowed to access the network based on an authentication method employing an authentication key, so that the security of an authentication process is further improved and a beacon device outside the certain range is prevented is from accessing the mesh network. Technical objects to be achieved in the present invention are not limited to those mentioned above, and other unmentioned technical objects will be obviously understood by those or ordinary skill in the art from the description below.

One aspect of the present invention provides an authentication method for a wireless mesh network performed by a service device, the method including: an operation of setting a criterion for forming a mesh network as a certain spatial range; an operation of setting an authentication key for accessing the mesh network; a first authentication operation of determining whether a beacon device has the authentication key set for the mesh network when the beacon device attempts to access the mesh network; a second authentication operation of collecting location information of the beacon device attempting to access the mesh network and determining whether a location of the beacon device is within the certain spatial range; and allowing the beacon device to access the mesh network when the beacon device passes through the first authentication operation and the second authentication operation.

Another aspect of the present invention provides a service device including: a communication module configured to exchange data with one or more beacon devices or mobile communication terminals; and a control module configured to set a criterion for forming a mesh network as a certain spatial range, set an authentication key for accessing the mesh network, perform a first authentication operation of determining whether a beacon device has the authentication key set for the mesh network and a second authentication operation of determining whether a location of the beacon device is within the certain spatial range when the beacon device attempts to access the mesh network, and allow the beacon device to access the mesh network when the beacon device passes through the first authentication operation and the second authentication operation.

Another aspect of the present invention provides a computer-readable recording medium storing a program for carrying out the above-described authentication method for a wireless mesh network.

According to the inventive authentication method for a wireless mesh network, it is possible to prevent a beacon device that is not wanted by an administrator from joining a mesh network using location information in addition to an authentication key when forming the mesh network.

Also, according to the present invention, it is possible to construct a wireless network having resultant flexibility and extendability, such as speed and economic efficiency in network establishment, redundancy based on multiple paths, etc., without worrying about security, connect the wireless network to a representative access point (AP) in a wired manner so that beacon devices which will serve as antennas like existing wireless communication base stations (BSs) become mesh nodes and wirelessly connect all sections, and implement the structure of a wired mesh network in even a wireless network so that a limitation of an existing wireless local area network (WLAN) may be overcome.

The effects of the present invention are not limited to the aforementioned effects, and other effects, which are not mentioned above, will be apparent to those of ordinary skill in the art to which the present invention pertains from the description below.

DETAILED DESCRIPTION

Figure 1:
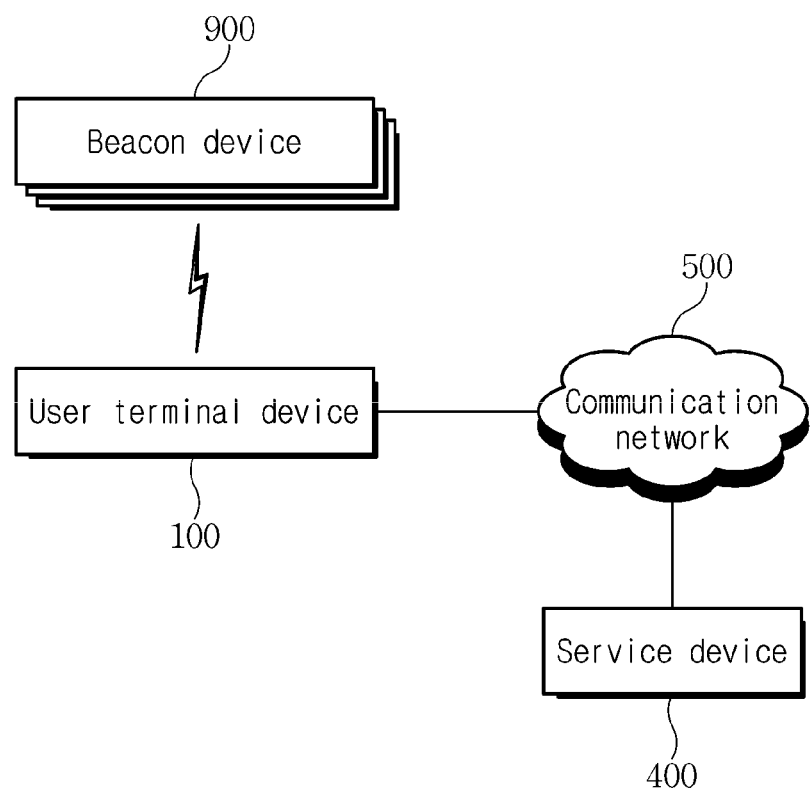
FIG. 1 is a block diagram schematically showing an overall system which carries out an authentication method for a wireless mesh network according to an embodiment of the present invention.

Embodiments of the present invention will now be described more fully with reference to the accompanying drawings to clarify features and advantages of the present invention.

In the detailed description of embodiments of the present invention, when detailed descriptions on the known art related to the present invention are determined to obscure the subject matter of the present invention, the detailed descriptions will be omitted. Throughout the drawings, like elements are noted by like numerals as much as possible.

Terms or words used in this specification and claims described below are not to be construed as common or dictionary meanings but are to be construed as meanings and concepts in accordance with the technical spirit of the present invention based on a principle that the inventor can define terms appropriately for best explaining his or her own invention.

Embodiments described in the present specification and configurations shown in the drawings are merely exemplary embodiments of the present invention and do not represent the whole technical spirit of the present invention. Thus, it is to be understood that there can be various equivalents and modifications at the filing date of the present invention.

Although terms including ordinal numbers, such as "first," "second," etc., may be used to describe various components, the components should not be defined by such terms. Such terms are used only for the purpose of distinguishing one component from another component. For example, a first component may be designated a second component without departing from the scope of the present invention and, similarly, the second component may also be designated the first component.

It will be understood that when a component is referred to as being "connected" or "coupled" to another component, the component can be logically or physically connected or coupled to the other component. In other words, the component may be connected or coupled to the other component directly or indirectly, or intervening components may be present.

The terminology used herein to describe particular embodiments of the invention is not intended to limit the scope of the invention. Elements of the invention referred to in the singular may number one or more, unless the context clearly indicates otherwise.

It will be further understood that the terms "comprise," "include," etc., when used herein, specify the presence of stated features, numbers, steps, operations, components, parts, or combinations thereof, but do not preclude the presence or addition of one or more other features, numbers, steps, operations, components, parts, or combinations thereof.

Also, the terms " . . . unit," " . . . er," "module," etc. used herein indicate units for processing at least one function or operation and may be implemented by hardware, software, or combinations thereof.

Further, the singular forms "a," "an," "one," "the," etc. include plural referents unless the context (particularly in the context of the claims) clearly dictates otherwise.

Embodiments of the present invention include a computer-readable medium which has computer-executable instructions or has or transfers a data structure stored therein. The computer-readable medium may be any available medium which is accessible by a general or special purpose computer system.

For example, the computer-readable medium may include a physical storage medium, such as a random access memory (RAM), a read-only memory (ROM), an erasable programmable ROM (EPROM), a compact disc ROM (CD-ROM), other optical disk storage devices, a magnetic disk storage device, other magnetic storage devices, or any other medium which may be used to store and transfer a certain program code means having the form of computer-executable instructions, computer-readable instructions, or data structures and may be accessed by a general or special purpose computer system, but is not limited thereto.

In the following descriptions and claims, a "network" is defined as one or more data links that enable transmission of electronic data between computer systems and/or modules. When information is transmitted or provided to a computer system through a network or another (wired, wireless, or a combination thereof) communication connection, the connection may be understood as a computer-readable medium.

Computer-readable instructions include, for example, instructions and data which cause a general-purpose computer system or a special-purpose computer system to perform a specific function or a group of functions. Computer-executable instructions may be, for example, binaries, intermediate format instructions such as an assembly language, or even source code.

Embodiments of the present invention may be implemented in a network computing environment with various types of computer system configurations including personal computers (PCs), laptop computers, handheld devices, multiprocessor systems, microprocessor-based or programmable consumer electronics, network PCs, minicomputers, mainframe computers, mobile telephones, personal digital assistants (PDAs), pagers, and so on. The present invention may also be implemented in a distributed system environment in which both local and remote computer systems linked by a wired data link, a wireless data link, or a combination thereof through a network perform tasks. In a distributed system environment, program modules may be located in both local and remote memory storage devices.

An authentication method for a wireless mesh network using the beacon technology according to the present invention will be described based on the Bluetooth low energy (BLE) data communication technology.

While near field communication (NFC) is limitedly usable within tens of centimeters only, Bluetooth communication may be used within tens of meters and thus is applied to far more fields. In particular, according to Bluetooth communication, it is possible to transfer data just by passing through a place in which a beacon device is installed without having to draw a device close to a reader and tag the device like NFC, and also possible to read the detailed positional movement of a user in a building and transfer customized data.

However, the authentication method for a wireless mesh network according to the present invention is not limited to BLE or Bluetooth, and various personal area network (PAN)-based short-range communication technologies including Zigbee, ultra-wideband (UWB), ANT, wireless fidelity (WiFi), NFC, etc. may be applied thereto.

Hereinafter, the authentication method for a wireless mesh network and a computer-readable recording medium storing a program for carrying out the method according to exemplary embodiments of the present invention will be described in detail with reference to drawings.

First, an authentication system for a wireless mesh network according to an embodiment of the present invention will be described.

FIG. 1 is a block diagram schematically showing an overall system which carries out the authentication method for a wireless mesh network according to an embodiment of the present invention.

As shown in FIG. 1, the authentication system for a wireless mesh network according to an embodiment of the present invention may include a mobile communication terminal device 100, beacon devices 900, a service device 400, and a communication network 500 connecting them.

The authentication system may be installed at a place within a certain range which is an arbitrary range in accordance with an administrator's necessity, for example, the entire area or some floors of a department store or a discount store, or may be installed in a certain regional range including a large number of buildings.

Here, the beacon devices 900 transmit and receive beacon signals through short-range wireless communication, such as BLE, WiFi, etc., and the signals are received by the mobile communication terminal device 100 near the beacon devices 900. The mobile communication terminal device 100 receiving a beacon signal transmits information (e.g., a universally unique identifier (UUID), receiving intensity, etc.) included in the beacon signal to the service device 400 through the communication network 500. The service device 400 stores respective pieces of service information (a coupon, discount information, advertising information, etc.) according to the beacon devices 900. The service device 400 transmits service information of a beacon device 900 corresponding to the information transmitted by the mobile communication terminal device 100 to the mobile communication terminal device 100 and causes the service information to be output to a user through the mobile communication terminal device 100.

During the process in which the mobile communication terminal device 100 receives the information included in the beacon signal from the beacon device 900 and transmits the information to the service device 400 through the communication network 500, service traffic occurs in the beacon device 900.

The mobile communication terminal device 100 denotes a device of a network user or administrator which may be connected to a wireless communication network provided by the present invention and transmit and receive various types of data. The user is a person who receives a customer service (provision of a coupon, discount information, an advertisement, etc.) provided through a wireless mesh network constituting the present invention, and the administrator is a person who manages the service device 400 for providing the customer service or a person who manages a particular beacon device 900.

Here, the term "terminal" may be replaced with the terms "user equipment (UE)," "mobile station (MS)," "mobile subscriber station (MSS)," "subscriber station (SS)," "advanced mobile station (AMS)," "wireless terminal (WT)," "machine-type communication (MTC) device," "machine-to-machine (M2M) device," "device-to-device (D2D) device," "station (STA)," and so on. However, a terminal is not limited thereto, and any device connected to the wireless communication network provided by the present invention may correspond to the mobile communication terminal device 100 mentioned in this specification. Units equivalent to the aforementioned units may be used as the mobile communication terminal device 100 according to the present invention. The mobile communication terminal device 100 may perform voice or data communication through the wireless communication network provided by the present invention, and to this end, the mobile communication terminal device 100 of the present invention may have a browser for transmission and reception of information, a memory for storing a program and a protocol, a microprocessor for executing various programs for calculation and control, and so on.

The mobile communication terminal device 100 according to an embodiment of the present invention may be implemented in various forms. For example, the mobile communication terminal device 100 mentioned in this specification may be a mobile terminal which employs wireless communication technologies of a smart phone, a tablet PC, a PDA, a portable multimedia player (PMP), a Motion Picture Experts Group (MPEG) audio layer-3 (MP3) player, and so on.

In particular, the mobile communication terminal device 100 according to an embodiment of the present invention is a terminal capable of Bluetooth communication (e.g., Bluetooth 4.0, that is, BLE) and WiFi connection. The mobile communication terminal device 100 may receive a beacon signal transmitted by the beacon devices 900 through BLE communication, also receive a beacon signal generated based on WiFi, and thus perform designated processing. In addition to this, the mobile communication terminal device 100 may also perform designated processing through bidirectional communication with a WiFi access point (AP) or other wireless APs.

Among such mobile communication terminal devices 100, a device which uses a service provided by the administrator of the service device 400 through the beacon devices 900 and the service device 400 is referred to as a user terminal device, and a device used by a person who provides a network and provides a service within a certain range is referred to as an administrator terminal device.

As for the beacon devices 900, the plurality of beacon devices 900 denote devices which are installed at certain locations for a general beacon service and periodically transmit beacon signals. Here, the beacon signals may include beacon identification information including unique identification information assigned to the beacon devices 900, location information, etc., and the beacon identification information becomes a criterion for the mobile communication terminal device 100 to be provided with the beacon service.

Specifically, a beacon signal transmitted by a beacon device 900 is received by a mobile communication terminal device 100 present in communication coverage, and the mobile communication terminal device 100 receiving the beacon signal transmits a service request including beacon identification information extracted from the beacon signal to the service device 400. Accordingly, the service device 400 provides service information (e.g., a service page, etc.) corresponding to the beacon identification information to the mobile communication terminal device 100.

In the case of a BLE beacon, beacon identification information used in such a beacon service may be unique values of the BLE beacon including a UUID, a major/minor version, and a signal intensity.

Identification information of a BLE beacon generally consists of a 16-byte UUID, a 2-byte major version, and a 2-byte minor version. A UUID is an identifier standard used in software construction. A UUID was standardized as a part of the Distributed Computing Environment (DCE) by the Open Software Foundation (OSF) and is a unique identifier represented by 32 hexadecimal characters.

The UUID and the major and minor versions may be set as information for identifying different targets. For example, when a beacon service is installed and provided in an entire department store building, the UUID may be set as information indicating a particular floor of the department store, the major version may be set as serial numbers of stores with a common theme, for example, all cellular phone stores, and the minor version may be set as a serial number designated according to the brand name of a store or a serial number according to the location of the store.

In the case of a WiFi beacon, identification information may be WiFi-specific unique values including a basic service set identifier (BSSID), a frequency, and a signal intensity. A BSSID denotes a 48-bit identifier or a network ID for identifying a BSS according to the wireless local area network (WLAN) standard 802.11. In general, a BSSID denotes the media access control (MAC) address of AP equipment and is generated as a random value in the case of an independent BSS or an ad-hoc network.

Although BLE and WiFi are mentioned as examples, a wireless communication method of the beacon devices 900 according to an embodiment of the present invention is not limited thereto.

Also, a beacon device 900 according to an embodiment of the present invention may measure the intensity of a beacon signal received from a nearby beacon device 900 and measure the amount of its own service traffic.

In particular, the beacon devices 900 according to an embodiment of the present invention may store an authentication key during its setting and may transmit the authentication key when necessary. Also, the beacon devices 900 may store location information thereof during the setting process.

Such beacon devices 900 may be mapped to mobile communication terminal devices 100 and registered. Information generated through the mapping may be stored in the beacon devices 900 and the mobile communication terminal devices 100. When the mobile communication terminal devices 100 and the beacon devices 900 are mapped to each other, it is possible to set or control the beacon devices 900 through the mobile communication terminal devices 100.

In this way, the mobile communication terminal devices 100 may serve as input devices which receive the input of an authentication key and transmit the authentication key to the service device 400 to connect the beacon devices 900 to the mesh network, or may serve to implement the present invention not by transmitting location information of the beacon devices 900 but by transmitting location information of the mobile communication terminal devices 100 that are in close proximity to the beacon devices 900 during the control process of the beacon devices 900.

A configuration of the beacon devices 900 according to an embodiment of the present invention will be described in further detail below.

The service device 400 is a component for providing a service to the user through a network. The service device 400 may receive a packet for a requested service from the mobile communication terminal device 100 and transmit a response packet to the mobile communication terminal device 100 which has transmitted the packet in response to the received packet. Also, the service device 400 may control the beacon devices 900 through the communication network 500.

The service device 400 may be a web application server (WAS), an Internet information server (IIS), or a known web server or cache server using Apache Tomcat or NGINX on the Internet. Besides them, one of the devices mentioned as examples constituting a network computing environment may be the service device 400 according to an embodiment of the present invention. Also, the service device 400 supports an operating system (OS), such as Linux, Windows, etc., and may execute a received control command. In a software manner, the service device 400 may include a program module which is implemented using a language, such as C, C++, Java, Visual Basic, Visual C, or so on.

In particular, the service device 400 according to an embodiment of the present invention may control the beacon devices 900 and receive an authentication key or location information from each beacon device 900 or the mobile communication terminal device 100.

A configuration of the service device 400 according to an embodiment of the present invention will be described in further detail below.

In addition, the service device 400 of the present invention may be connected to the mobile communication terminal device 100 for implementing the present invention through the communication network 500, and the communication network 500 denotes a network, such as an Internet network, an intranet, a mobile communication network, a satellite communication network, etc., in which data may be transmitted and received according to the Internet protocol (IP) using various wired and wireless communication technologies. Also, the communication network 500 stores computing resources including hardware, software, etc. in combination with the service device 400 or the mobile communication terminal device 100. The concept of the communication network 500 collectively includes closed networks including a LAN, a wide area network (WAN), etc., open networks including the Internet, networks including a code division multiple access (CDMA) network, a wideband CDMA (WCDMA) network, a global system for mobile communications (GSM) network, a Long Term Evolution (LTE) network, an evolved packet core (EPC) network, etc., a next-generation network which will be implemented in the future, and a computing network.

In addition, the communication network 500 of the present invention includes, for example, a plurality of access networks (not shown) and a core network (not shown), and may include an external network, for example, an Internet network (not shown). In the access networks (not shown), wired and wireless communication are performed through the mobile communication terminal device 100 and the beacon devices 900, and the access networks (not shown) may be implemented with, for example, a plurality of base stations (BSs), such as a base transceiver station (BTS), a node BS (NodeB), an evolved NodeB (eNodeB), etc., and a BS controller (BSC), such as a radio network controller (RNC). Also, as mentioned above, digital signal processors and wireless signal processors integrally implemented in the BSs may be respectively classified into digital units (DUs) and radio units (RUs), and the plurality of RUs (not shown) may be separately installed in a plurality of areas and connected to the centralized DUs (not shown), so that the access networks (not shown) may be configured.

The core network (not shown) which constitutes a mobile network together with the access networks (not shown) serves to connect the access networks (not shown) to an external network, for example, an Internet network (not shown).

As mentioned above, the core network (not shown) is a network system which performs main functions, such as mobility control, switching, etc. between the access networks (not shown), for a mobile communication service. The core network (not shown) performs circuit switching or packet switching and manages and controls packet flow in the mobile network. Also, the core network (not shown) may manage mobility between frequencies and play a role for interworking traffic in the access networks (not shown), the core network (not shown), and another network, for example, an Internet network (not shown). The core network (not shown) may include a serving gateway (SGW), a packet data network (PDN) gateway (PGW), a mobile switching center (MSC), a home location register (HLR), a mobile mobility entity (MME), a home subscriber server (HSS), and so on.

The Internet network (not shown) denotes a general open communication network in which information is exchanged according to transmission control protocol (TCP)/IP, that is, a public network. The Internet network (not shown) is connected to the service device 400, and may provide a service provided by the service device 400 to the mobile communication terminal device 100 through the core network (not shown) and an access network (not shown) and provide service request information transmitted from the mobile communication terminal device 100 to the service device 400 through the access network (not shown) and the core network (not shown). Also, the Internet network (not shown) may connect the service device 400 and the mobile communication terminal device 100, thereby making it possible to provide a service using the beacon devices 900.

A processor installed in each device according to an embodiment of the present invention may process a program command for carrying out the method according to the present invention. In an embodiment, the processor may be a single-threaded processor, and in another embodiment, the processor may be a multithreaded processor. Further, the processor may process a command stored in a memory or a storage device.

Thus far, the overall system which carries out the authentication method for a wireless mesh network according to an embodiment of the present invention has been schematically described.

Subsequently, a mesh network structure will be described focusing on the beacon devices 900 in the overall system which carries out the authentication method for a wireless mesh network according to an embodiment of the present invention.

Figure 2:
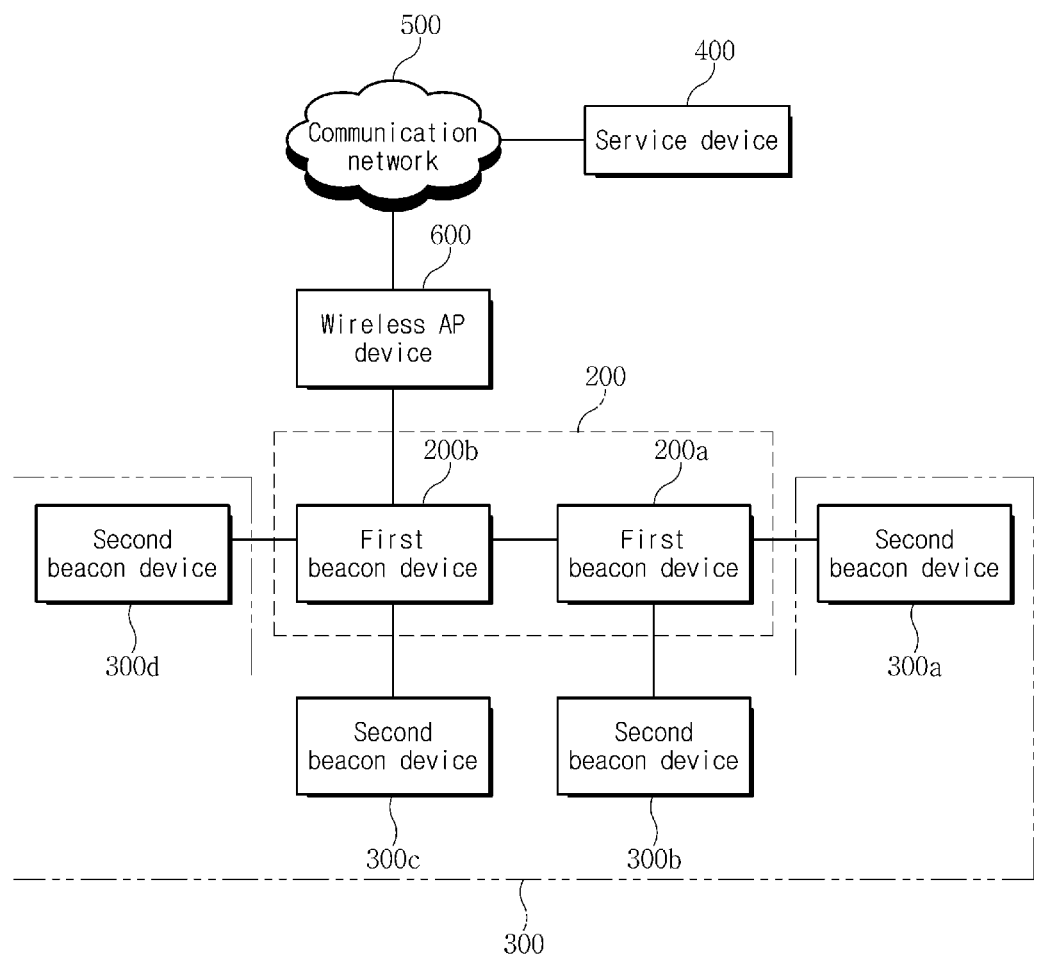
FIG. 2 is a block diagram schematically showing a structure of a mesh network in which the authentication method for a wireless mesh network according to an embodiment of the present invention is performed.

FIG. 2 is a block diagram schematically showing a structure of a mesh network in which the authentication method for a wireless mesh network according to an embodiment of the present invention is performed.

Referring to FIG. 2, a mesh network structure according to an embodiment of the present invention may include the communication network 500, a wireless AP device 600 connected to the communication network 500, first beacon devices 200 connectable to the wireless AP device 600, and second beacon devices 300 connected to the first beacon devices 200.

As mentioned above with reference to FIG. 1, the communication network 500 denotes a network, such as an Internet network, an intranet, a mobile communication network, a satellite communication network, etc., in which data may be transmitted and received according to the IP using various wired and wireless communication technologies. In the structure of FIG. 1, the communication network 500 serves as a passage for connecting the mobile communication terminal device 100 and the service device 400 and providing a service to the user or enabling an administrator to manage a network, and in the structure of FIG. 2, the communication network 500 serves as a passage for connecting the service device 400 and the wireless AP device 600 so that the service device 400 controls one or more beacon devices 900 through the communication network 500.

The first beacon devices 200 and the second beacon devices 300 are types of beacon devices 900 and both may be plural in number. A detailed structural difference will be described below.

The second beacon devices 300 are under management of the first beacon devices 200. The first beacon devices 200 are connected to the wireless AP device 600 to be connected to a wired network. The first beacon devices 200 connected to the wireless AP device 600 are not assumed to be a particular first beacon device 200, and one or more first beacon devices 200 may be connected to the wireless AP device 600. Conversely, there may be a plurality of wireless AP devices 600, and the wireless AP devices 600 may be connected to one or more first beacon devices 200.

Each first beacon device 200 does not necessarily manage one second beacon device 300 and may manage a plurality of second beacon devices 300. Referring to FIG. 2, it is possible to see that each of first beacon devices 200a and 200b manages two second beacon devices 300a and 300b or 300c or 300d.

The first beacon devices 200 may be connected to the second beacon devices 300 through pairing and bonding. The plurality of second beacon devices 300 may be connected to the first beacon devices 200 in various manners, such as a star topology, a ring topology, or so on.

Particularly, in the present invention, the first beacon devices 200 are connected to the second beacon devices 300 through a short-range communication network (PAN) and manage and control the second beacon devices 300 by transmitting certain command messages or request messages to the second beacon devices 300.

Here, one first beacon device 200 is not necessarily connected to one second beacon device 300 for management. One first beacon device 200 may manage a plurality of second beacon devices 300 and may be connected to another first beacon device 200 through the short-range communication network (PAN).

The short-range communication method between the first beacon devices 200 and the short-range communication method between the first beacon device 200 and the second beacon devices 300 may be configured or employed differently from each other to implement the present invention.

The first beacon devices 200 may be controlled by the service device 400 through the communication network 500.

The first beacon devices 200 may be classified into a higher layer and a lower layer. Here, when a particular first beacon device 200a is a basis, the higher layer denotes a first beacon device 200b which is located in a closer stage than the particular first beacon device 200a to the wireless AP device 600 in a connection operation. On the other hand, a first beacon device 200 which is located in a farther stage than the particular first beacon device 200a is defined to be in the lower layer.

Also, when an arbitrary beacon device is a basis, a beacon device which is connected to the arbitrary beacon device and one layer higher is referred to as a parent node, a beacon device which is one layer lower than the arbitrary beacon device is referred to as a child node, and beacon devices existing in the same layer as the arbitrary beacon device, that is, child nodes of the parent node of the arbitrary beacon device, are referred to as sibling nodes excluding the arbitrary beacon device.

In FIG. 2, the first beacon device 200b is a parent node of the first beacon device 200a, and the first beacon device 200a is a child node of the first beacon device 200b. Also, the second beacon devices 300a and 300b may be sibling nodes.

The first beacon devices 200 and the second beacon devices 300 according to embodiments of the present invention may transmit an authentication key and location information to the service device 400 through the wireless AP device 600 and the communication network 500.

Configurations of the first beacon devices 200 and the second beacon devices 300 according to embodiments of the present invention will be described in detail below.

The wireless AP device 600 may be connected to the first beacon devices 200 and may cause the wirelessly connected beacon devices 900 to be connected to the communication network 500. The wireless AP device 600 may make it possible to implement a wireless network in the same structure as a wired mesh network.

Thus far, the mesh network structure has been described focusing on the beacon devices 900 in the overall system which carries out the authorization method for a wireless mesh network according to an embodiment of the present invention.

Structures of the first beacon devices 200 and the second beacon devices 300 which carry out the authorization method for a wireless mesh network according to embodiments of the present invention will be described below with reference to FIGS. 3 and 4.

Figure 3:
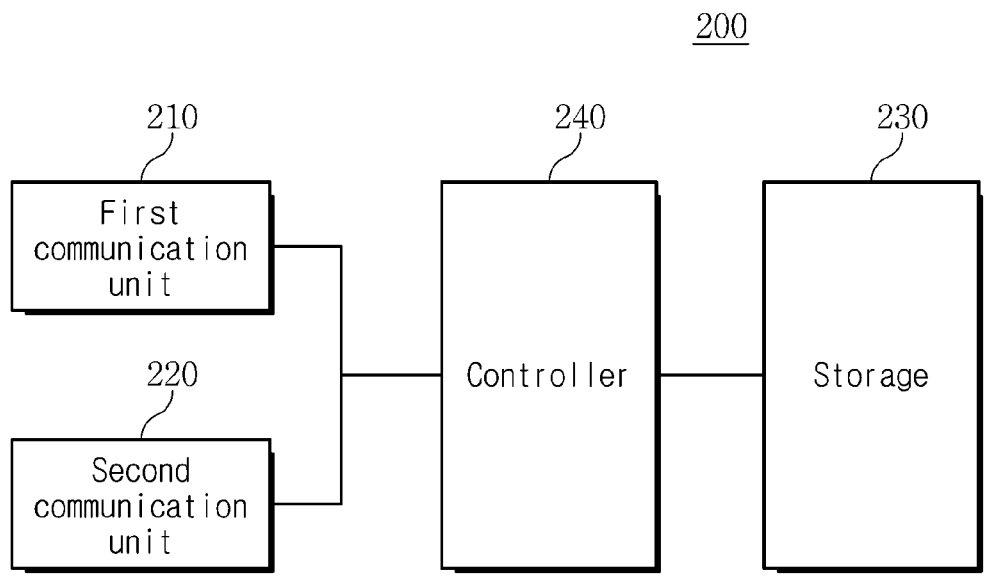
FIG. 3 is a block diagram showing a structure of a first beacon device which carries out the authentication method for a wireless mesh network according to an embodiment of the present invention.

FIG. 3 is a block diagram showing a structure of a first beacon device which carries out the authentication method for a wireless mesh network according to an embodiment of the present invention.

Referring to FIG. 3, a first beacon device 200 which carries out the authentication method for a wireless mesh network according to an embodiment of the present invention may include a first communication unit 210, a second communication unit 220, a storage 230, and a controller 240.

The first communication unit 210 and the second communication unit 220 are means for receiving data from an external source and transmitting data to the external source, and may be represented by logical combinations of one or more software and/or hardware modules, for example, a network interface card and the corresponding network driver interface specification (NDIS) stack. The communication units 210 and 220 may support various communication protocols. The communication units 210 and 220 may support various mobile communication standards, such as advanced mobile phone system (AMPS), CDMA, GSM, WCDMA, high speed downlink packet access (HSDPA), LTE, LTE-advanced (A), etc., and may also support short-range wireless network technologies including BLE and Zigbee. Besides them, the communication units 210 and 220 may support wired communication standards including Ethernet, home phone-line networking alliance (PNA), power line communication (PLC), and so on.

Particularly, in the present invention, the first communication unit 210 may be connected to a first communication unit 210 of another first beacon device 200, and may also be connected to the wireless AP device 600 to communicate with the service device 400 through the communication network 500. Also, the first communication unit 210 serves to transmit an authentication key and location information to the service device 400 by way of a first beacon device 200 in a higher layer, the wireless AP device 600, and the communication network 500.

Here, the first communication unit 210 preferably uses wireless communication methods including WLAN, WiFi, wireless broadband (WiBro), worldwide interoperability for microwave access (WiMAX), HSDPA, and so on. However, wireless communication methods of the first communication unit 210 are not limited thereto, and it is also possible to use wired communication methods including Ethernet, digital subscriber line (xDSL; asymmetric DSL (ADSL) and very-high-bitrate DSL (VDSL)), hybrid fiber coaxial (HFC) cable, fiber to the curb (FTTC), fiber to the home (FTTH), etc. according to a system implementation method.

The second communication unit 220 exchanges signals and various types of data for maintaining a wireless connection with a second beacon device 300. Here, the second communication unit 220 may perform PAN-based communication including Bluetooth communication.

The storage 230 is a component for storing data or a program executed or processed by the controller 240. Basically, the storage 230 may store an OS for booting the first beacon device 200 and operating each of the components described above, an application program for performing a user function for supporting a distribution function of the first beacon device 200, and so on.

Particularly, in the present invention, information on another nearby first beacon device 200 or a second beacon device 300 according to the present invention may be registered in the storage 230. This information includes location information of each beacon device 900.

Information on the nearby wireless AP device 600 may also be stored. When a transmission failure occurs during communication between the first beacon device 200 and a currently connected device, the information on each beacon device 900 or the wireless AP device 600 may serve as a preliminary list of targets which are connectable alternatives. Also, the information may be data for determining whether another beacon device 900 is within a certain range set by the administrator. The storage 230 may also store an authentication key which has been input for network access during initial setting of the first beacon device 200.

The storage 230 includes magnetic media, such as a hard disk, a floppy disk, and a magnetic tape, optical media, such as a CD-ROM and a digital video disk (DVD), magneto-optical media, such as a floptical disk, and main memory devices and auxiliary memory devices, such as a ROM, a RAM, and a flash memory. The storage 230 may largely include a program region and a data region.

The controller 240 is a component for performing overall control of the first beacon device 200 and may be implemented by including at least one processor. The processor may be a single-threaded processor, and in another embodiment, the processor may be a multithreaded processor. Further, the controller 240 may operate by processing a command stored in the storage 230 through the at least one processor. Here, the command may include, for example, an interpretable command, such as a script command including a JavaScript or ECMAScript command, executable code, and other commands stored in a computer-readable medium.

Particularly, in the present invention, the computer-readable recording medium storing the program for carrying out the authentication method for a wireless mesh network according to the present invention may be stored in the storage 230 and loaded and executed by the controller 240.

When the authentication method for a wireless mesh network according to the present invention is carried out, the controller 240 may instruct the first beacon device 200 to transmit the authentication key stored in the first beacon device 200 to the service device 400 through the communication network 500.

The controller 240 may also instruct the first beacon device 200 to transmit the location information to the service device 400 through the first beacon device 200 in the higher layer and the communication network 500. However, the location information may also be included in identification information of a beacon signal transmitted by the first beacon device 200 and may arrive at the service device 400 through the mobile communication terminal device 100.

Also, when a command to connect to another beacon device 900 through a wireless mesh network is received from the service device 400, the controller 240 may control the first communication unit 210 and the second communication unit 220 to carry out the command.

Thus far, the first beacon device 200 according to an embodiment of the present invention has been described.

A main configuration and an operation method of a second beacon device 300 according to an embodiment of the present invention will be described below.

Figure 4:
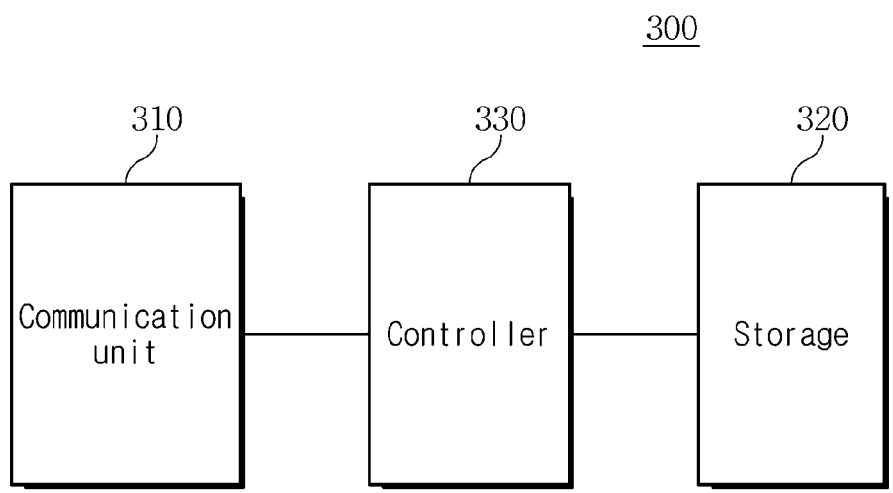
FIG. 4 is a block diagram showing a structure of a second beacon device which carries out the authentication method for a wireless mesh network according to an embodiment of the present invention.

FIG. 4 is a block diagram showing a structure of a second beacon device which carries out the authentication method for a wireless mesh network according to an embodiment of the present invention.

Referring to FIG. 4, a second beacon device 300 which carries out the authentication method for a wireless mesh network according to an embodiment of the present invention may include a communication unit 310, a storage 320, and a controller 330.

Like the communication units of the first beacon device 200, the communication unit 310 is a means for receiving data from an external source and transmitting data to the external source, and may be represented by a logical combination of one or more software and/or hardware modules, for example, a network interface card and the corresponding NDIS stack.

Particularly, in the present invention, the communication unit 310 periodically or aperiodically exchanges signals and various types of data for maintaining a wireless connection with a first beacon device 200. Also, the communication unit 310 transmits location information and an authentication key to the first beacon device 200 connected thereto, so that the first beacon device 200 may transfer the location information and the authentication key to the service device 400 by way of a first beacon device 200 in a higher layer, the wireless AP device 600, and the communication network 500. Here, the communication unit 310 may perform PAN-based communication including Bluetooth communication.

The storage 320 is a component for storing data or a program executed or processed by the controller 330. Basically, the storage 320 may store an OS for booting the second beacon device 300 and operating each component described above, an application program for performing a user function for supporting a distribution function of the second beacon device 300, and so on. The storage 320 includes magnetic media, such as a hard disk, a floppy disk, and a magnetic tape, optical media, such as a CD-ROM and a DVD, magneto-optical media, such as a floptical disk, and main memory devices and auxiliary memory devices, such as a ROM, a RAM, and a flash memory. The storage 320 may largely include a program region and a data region and store application programs necessary for functional operations of the second beacon device 300. When activating each function in response to a user's request, the second beacon device 300 provides the function by executing the corresponding application program under control of the controller 330.

Particularly, in the present invention, information on another nearby first beacon device 200 or second beacon device 300 according to the present invention may be registered in the storage 320, like the storage 230 of the first beacon device 200. This information includes location information of each beacon device 900 and may also include information on the nearby wireless AP device 600. The information may serve as a preliminary list of targets which are connectable alternatives. Also, the information may be data for determining whether another beacon device 900 is within the certain range set by the administrator. The storage 320 may also store an authentication key which has been input for network access during initial setting of the second beacon device 300.

The controller 330 is a component for performing overall control of the second beacon device 300 and may be implemented by including at least one processor. The processor may be a single-threaded processor, and in another embodiment, the processor may be a multithreaded processor. Further, the controller 330 may operate by processing a command stored in the storage 320 through the at least one processor. Here, the command may include, for example, an interpretable command, such as a script command including a JavaScript or ECMAScript command, executable code, and other commands stored in a computer-readable medium.

Particularly, in the present invention, the computer-readable recording medium storing the program for carrying out the authentication method for a wireless mesh network according to the present invention may be stored in the storage 320 and loaded and executed by the controller 330.

When the authentication method for a wireless mesh network according to the present invention is carried out, the controller 330 may instruct the second beacon device 300 to transmit the authentication key stored in the second beacon device 300 to the service device 400 through the communication network 500.

The controller 330 may also instruct the second beacon device 300 to transmit the location information to the service device 400 through the first beacon device 200 in the higher layer and the communication network 500. However, the location information may also be included in identification information of a beacon signal transmitted by the second beacon device 300 and may reach the service device 400 through the mobile communication terminal device 100.

Also, when a command to form a wireless mesh network is received from the service device 400, the controller 330 may control the communication unit 310 to carry out the command.

Thus far, the second beacon device 300 according to an embodiment of the present invention has been described.

A structure of the service device 400 which carries out the authentication method for a wireless mesh network according to an embodiment of the present invention will be described now.

Figure 5:
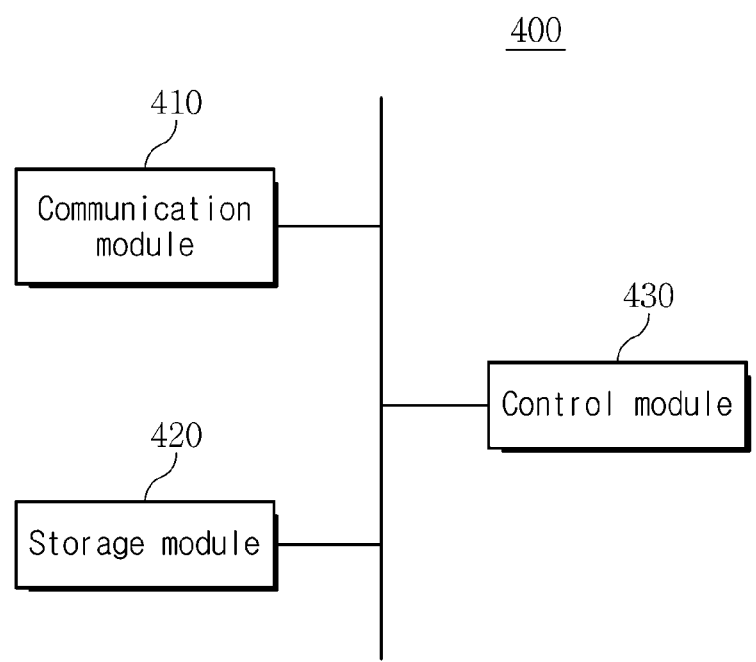
FIG. 5 is a block diagram showing a structure of a service device which carries out the authentication method for a wireless mesh network according to an embodiment of the present invention.

FIG. 5 is a block diagram showing a structure of a service device which carries out the authentication method for a wireless mesh network according to an embodiment of the present invention.

Referring to FIG. 5, the service device 400 according to an embodiment of the present invention may include a communication module 410, a storage module 420, and a control module 430.

The term "module" denotes each component which performs a certain function and may be implemented as hardware, software, or a combination thereof. For example, a module may be a program module, which includes components, such as software components, object-oriented software components, class components, and task components, processes, functions, attributes, procedures, subroutines, segments of program code, drivers, data, databases, data structures, tables, arrays, and variables executed by a processor to perform certain functions. Functions provided in components and modules may be combined into fewer components and modules or subdivided into additional components and modules.

Among the aforementioned components, the communication module 410 is a means for receiving data from an external source and transmitting data to the external source. The communication module 410 connects to the wireless AP device 600 through the communication network 500 and is connected to the beacon devices 900 through the wireless AP device 600, thereby serving to perform communication. Also, the communication module 410 may collect location information from the beacon devices 900 or the mobile communication terminal device 100 and receive an authentication key of a beacon device 900. Further, the communication module 410 may transmit a command transmitted by the control module 430 to the beacon devices 900 and perform other operations, thereby serving to support information exchange with the beacon devices 900 or the mobile communication device 100.

The storage module 420 is a component for storing information on the one or more beacon devices 900 constituting a mesh network. The storage module 420 may also store information on a connectable AP device and information on a channel to which each beacon device 900 may change its channel.

Further, the storage module 420 may store an authentication key set for access to a wireless mesh network and store a mapping table for extracting location information by interpreting identification information of each beacon device 900.

The control module 430 is a component for performing overall control of the service device 400 and may be implemented with support of at least one processor. The processor may be a single-threaded processor, and in another embodiment, the processor may be a multithreaded processor. Also, the control module 430 may operate by processing a command stored in the storage module 420 through the at least one processor. Here, the command may include, for example, an interpretable command, such as a script command including a JavaScript or ECMAScript command, executable code, and other commands stored in a computer-readable medium.

Particularly, in the present invention, the control module 430 may set a criterion for forming a mesh network with beacon devices as a certain spatial range. Accordingly, beacon devices 900 which may access the wireless mesh network are determined based on the certain spatial range. When an entire third floor of a particular department store is set as a spatial range for forming a wireless mesh network, beacon devices which are or will be located in the third floor may join the wireless mesh network, but beacon devices located somewhere other than the third floor may not join the wireless mesh network.

Also, the control module 430 may set an authentication key for accessing the mesh network. When a beacon device 900 attempts to access the mesh network after the authentication key is set, the control module 430 may perform a first authentication operation of determining whether or not the beacon device 900 has the authentication key set for the mesh network.

The first authentication operation may be performed by receiving an authentication key from a mobile communication terminal device 100 which is mapped to the beacon device 900 and registered in advance and comparing whether the received authentication key is identical to the set authentication key. As described above, the mobile communication terminal device 100 mapped to the beacon device 900 may serve as an input device for inputting an authentication key. The authentication key may be transmitted directly through the mesh network by the beacon device 900 which attempts to access the mesh network.

Also, the control module 430 performs a second authentication operation of collecting location information of the beacon device 900 which attempts to access the mesh network and determining whether the location of the beacon device 900 is within the preset certain spatial range. The location information stored in the beacon device 900 may be received through the mesh network, or the location information may be extracted from identification information of the beacon device 900. Also, location information of the mobile communication terminal device 100 may be collected instead of the location information of the beacon device 900. Since the mobile communication terminal device 100 is close to the beacon device 900 for communication with the beacon device 900, the object of the present invention may be achieved even by collecting the location information of the mobile communication terminal device 100.

When it is determined that the received authentication key is identical to the authentication key of the service device 400 as the comparison result, the beacon device 900 passes through the first authentication operation. When the location of the beacon device 900 obtained by collecting the location information is within the preset spatial range of the mesh network, the beacon device 900 passes through the second authentication operation. When the beacon device 900 passes through the first and second authentication operations, the control module 430 allows the beacon device 900 to access the mesh network.

When a new beacon device 900 is allowed to access the wireless mesh network or does not pass through the authentication and is rejected from accessing the wireless mesh network, the administrator of the service device 400 may be notified of this by the control module 430. The notification may be made through a separate output device (not shown) or transmission of a user message.

The output device (not shown) may be a display or audio device connected to the service device 400 or a computing device which is separately configured and installed to manage the service device 400.

In the case of transmission of a user message, a message indicating completion of setting file collection may be transmitted using a short message service (SMS), a multimedia messaging service (MMS), a mobile messenger, or a computer program separately developed to implement the present invention.

Detailed operations of the service device 400 according to an embodiment of the present invention will be clearly understood through an example diagram and a flowchart described below.

The authentication method for a wireless mesh network according to an embodiment of the present invention will now be described with reference to FIGS. 6 and 7.

Figure 6:
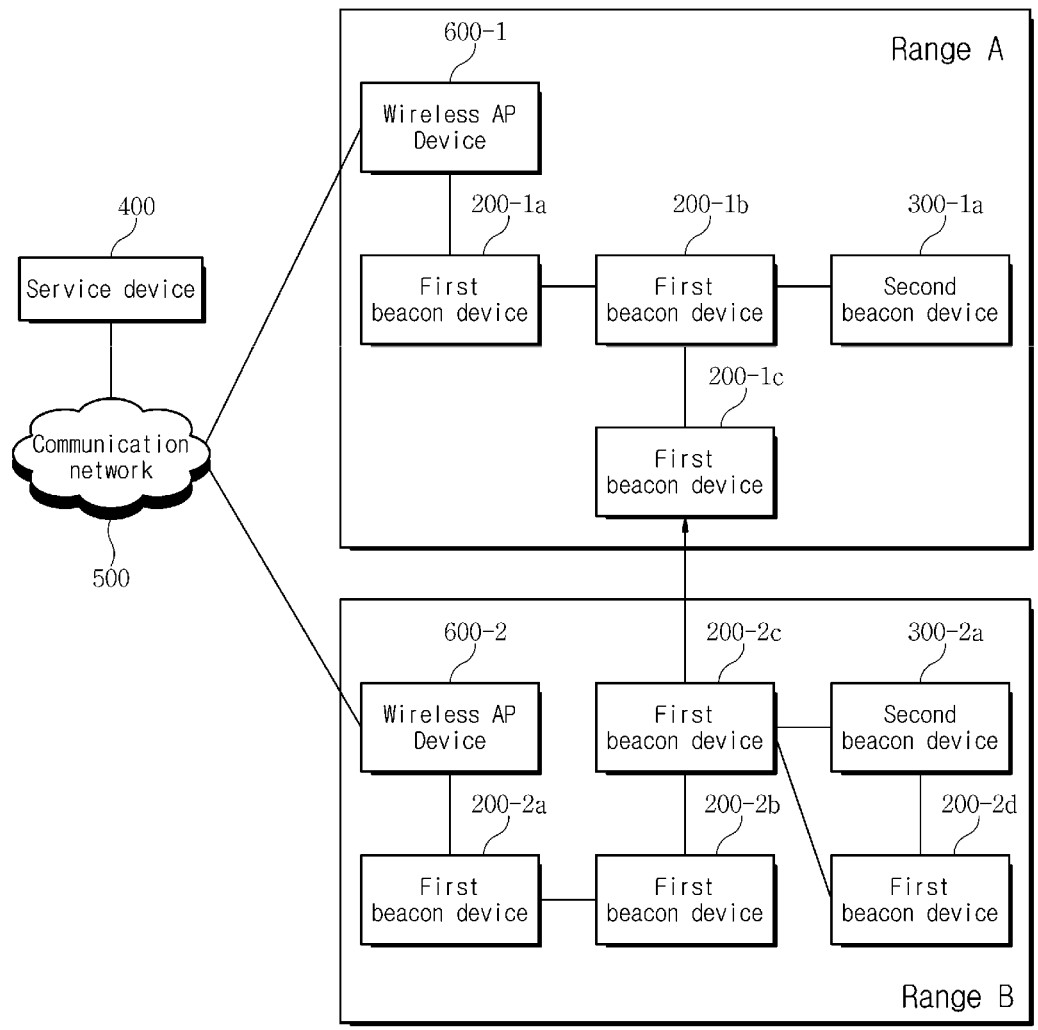
FIG. 6 is an example diagram showing the authentication method for a wireless mesh network according to an embodiment of the present invention.

FIG. 6 is an example diagram showing the authentication method for a wireless mesh network according to an embodiment of the present invention.

Referring to FIG. 6, it is possible to see that a range A and a range B for forming a wireless mesh network are separately set.

In the example diagram, beacon devices 200-1a, 200-1b, 200-1c, and 300-1a belonging to the range A and beacon devices 200-2a, 200-2b, 200-2c, 200-2d, and 300-2a belonging to the range B may be assigned the same authentication key or different authentication keys by the service device 400.

When the range A and the range B have the same authentication key, or even when the range A and the range B have different authentication keys, an administrator of the range B may know the authentication key of the range A. In this case, according to an existing authentication method, the first beacon device 200-2c of the range B may be connected to the first beacon device 200-1c of the range A as shown in the example diagram. When the administrator of the range B accesses the mesh network of the range A in this way without permission of an administrator of the range A, problems including an increase in the traffic of the range A, threats to security, etc. may occur.

To prevent these cases, according to the present invention, when the first beacon device 200-2c attempts to access the mesh network of the range A, not only the authentication key but also location information is collected. When the service device 400 sets a mesh network to be formed by only beacon devices of the range A, the first beacon device 200-2c is outside the range A and thus does not pass through the second authentication operation even after passing through the first authentication operation with the authentication key. Therefore, the first beacon device 200-2c is not allowed to access the mesh network of the range A.

The service device 400 may modify a mesh network setting so that a beacon device of the range B may access the mesh network of the range A, and may also make a setting so that a beacon device in the range B may access the mesh network of the range A but a beacon device in the range B may not access a mesh network of the range B.

Figure 7:
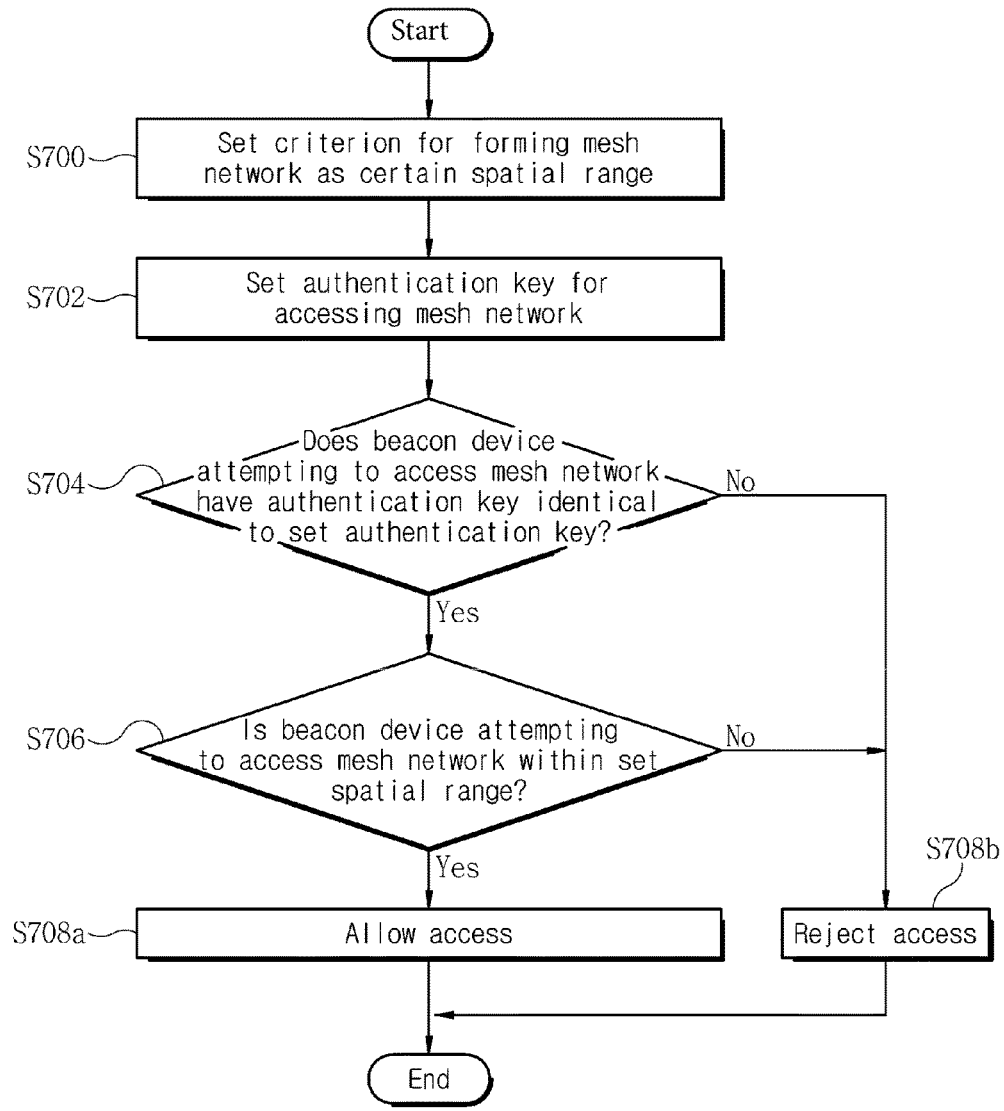
FIG. 7 is a flowchart illustrating operations of a service device carrying out the authentication method for a wireless mesh network according to an embodiment of the present invention.

FIG. 7 is a flowchart illustrating operations of a service device carrying out the authentication method for a wireless mesh network according to an embodiment of the present invention.

Referring to FIG. 7, first, a criterion for forming a mesh network with beacon devices 900 is set as a certain spatial range (S700). A single service device 400 may have one or more spatial ranges. For example, the service device 400 may set an entire department store as the spatial range so that all beacon devices in the department store may be connected to each other, or may divide the department store according to floor so that beacon devices on the first floor may be connected to each other and beacon devices on the second floor may be connected to each other.

When the range of a mesh network is determined, the service device 400 sets an authentication key for accessing the mesh network (S702). The same authentication key may be set for all mesh networks managed by the service device 400, or a different authentication key may be set for each specified range. For example, even when spatial ranges of mesh networks of the first floor and the second floor of a department store are separated from each other, the same authentication key may be set for both mesh networks, or different authentication keys may be respectively set for the mesh networks of the first floor and the second floor.

When the authentication key is set and a beacon device 900 attempts to access a mesh network having a certain range, it is determined whether the beacon device 900 has the same authentication key as set by the service device 400 (a first authentication operation, S704). Here, since the authentication key is stored in the beacon device 900 in advance, the beacon device 900 may transmit the authentication key through the mesh network, and the service device 400 may receive and use the authentication key. Alternatively, a mobile communication terminal device 100 may be mapped to the beacon device 900 which attempts to access the mesh network and registered in the service device 400 in advance, and in this case, the mobile communication terminal device 100 instead of the beacon device 900 may transmit the authentication key using an application for controlling the beacon device 900. The mobile communication terminal device 100 and the beacon device 900 may be mapped to each other on a one-to-one basis, a one-to-many basis, or a many-to-many basis.

Concurrently with the first authentication operation, a process of collecting location information of the beacon device 900 which attempts to access the mesh network and determining whether the location of the beacon device 900 is within the spatial range set by the service device 400 proceeds (a second authentication operation, S706). The location information may be stored in the beacon device 900 in advance and transmitted to the service device 400 through the mesh network.

Also, the location information may be stored in identification information of the beacon device 900. As mentioned above, the identification information may be a UUID or a BSSID. The identification information may have various forms, such as a 16-digit number in a base32 system, a 48-bit data packet, and so on.

In the case of a BLE beacon described above, when a beacon service is installed and provided in an entire department store building, the UUID may be set as information indicating a particular floor of the department store, the major version may be set as serial numbers of store with a common theme, for example, all cellular phone stores, and the minor version may be set as a serial number designated according to the brand name of a store or a serial number according to the location of the store.

In addition, the location information presented in identification information may be set and stored as a latitude, a longitude, and a height, or an arbitrary serial number may be given to an address and used as the location information.

The service device 400 may receive the identification information of the beacon device 900 including such location information through the mobile communication terminal device 100 which has received a beacon signal and the communication network 500. For interpretation of the identification information, the service device 400 may read a previously stored mapping table from the storage module 420 according to a method in which the location information is stored and collect the location information.

The location information may be stored in the beacon device 900 in advance as mentioned above, or may be collected through the mobile communication terminal device 100 and used. The beacon device 900 is used for short-range communication, and the mobile communication terminal device 100 for receiving a beacon signal is within a range of tens of meters from the beacon device 900. The location of the mobile communication terminal device 100 may be determined through a global positioning system (GPS) installed in the mobile communication terminal device 100 or using a method of triangulation with the beacon device 900. Also, using a reception signal intensity, it is possible to know the distance between the beacon device 900 and the mobile communication terminal device 100.

In an example of generating location information with a reception signal intensity, when the mobile communication terminal device 100 determines its own location using the GPS and determines the distance and direction of the beacon device 900 using an intensity of a beacon signal received from the beacon device 900, it is possible to know the location of the beacon device 900 which has transmitted the beacon signal. In this way, the mobile communication terminal device 100 generates and transmits the location information of the beacon device 900 to the service device 400 through the communication network 500.

When both of the first authentication operation and the second authentication operation are finished and the beacon device 900 which attempts to access the mesh network passes through both authentication operations, the service device 400 allows the beacon device 900 to access the mesh network (S708*a*).

When it is not possible to pass through any one of the first authentication operation and the second authentication operation, the service device 400 rejects access of the beacon device 900 (S708*b*).

Thus far, the authentication method for a wireless mesh network according to an embodiment of the present invention has been described.

The program stored in the recording medium may be read, installed, and executed by a computer, so that the above-described functions may be performed.

Here, in order for a computer to read the program stored in the recording medium and perform the functions implemented in the program, the aforementioned program may include code written in computer languages including C, C++, Java, a machine language, etc. which are readable by a processor (a central processing unit (CPU)) of the computer through an interface of the computer.

The code may include function code related to functions for defining the above-described functions, and may also include execution procedure-related control code which is necessary for the processor of the computer to perform the functions according to a certain procedure. Also, the code may further include additional information necessary for the processor of the computer to perform the above-described functions or memory reference-related code regarding a location (an address) in an internal or external memory that media refer to.

In addition when the processor of the computer requires communication with another computer, a server, etc. at a remote place to perform the above-described functions, the code may further include communication-related code regarding how the processor of the computer communicates with which computer, server, etc. at the remote place using a communication module of the computer and what kind of information or media the processor of the computer transmits or receives during communication.

Computer-readable media suitable to store computer program commands and data, for example, recording media, include magnetic media, such as a hard disk, a floppy disk, and a magnetic tape, optical media, such as a CD-ROM and a DVD, magneto-optical media, such as a floptical disk, and semiconductor memories, such as a ROM, a RAM, a flash memory, an EPROM, and an electrically erasable programmable ROM (EEPROM). The processor and the memories may be supplemented by or integrated into a special-purpose logical circuit.

The computer-readable recording media may be distributed to a computer system connected through a network, and computer-readable code may be stored and implemented in a distributed manner. A functional program for implementing the present invention, relevant code, and code segments may be readily inferred or modified by programmers skilled in the art to which the present invention pertains in view of a system configuration of the computer that reads the recording media to execute the program.

Each operation according to such embodiments of the present invention may be implemented as computer-executable instructions and executed by a computer system. Here, the term "computer system" is defined as one or more software modules, one or more hardware modules, or a combination of them which operate when performing an operation on electronic data. For example, the definition of a computer system includes a software module such as an OS of a PC and hardware components of the PC. The physical layout of a module is of little importance. The computer system may include one or more computers connected through a network.

Likewise, the computing system may be implemented as one physical device in which internal modules including a memory and a processor operate when performing an operation on electronic data.

In other words, an apparatus for carrying out the authentication method for a wireless mesh network according to the present invention may be implemented to perform the above-described embodiments based on a computer system described below.

Figure 8:
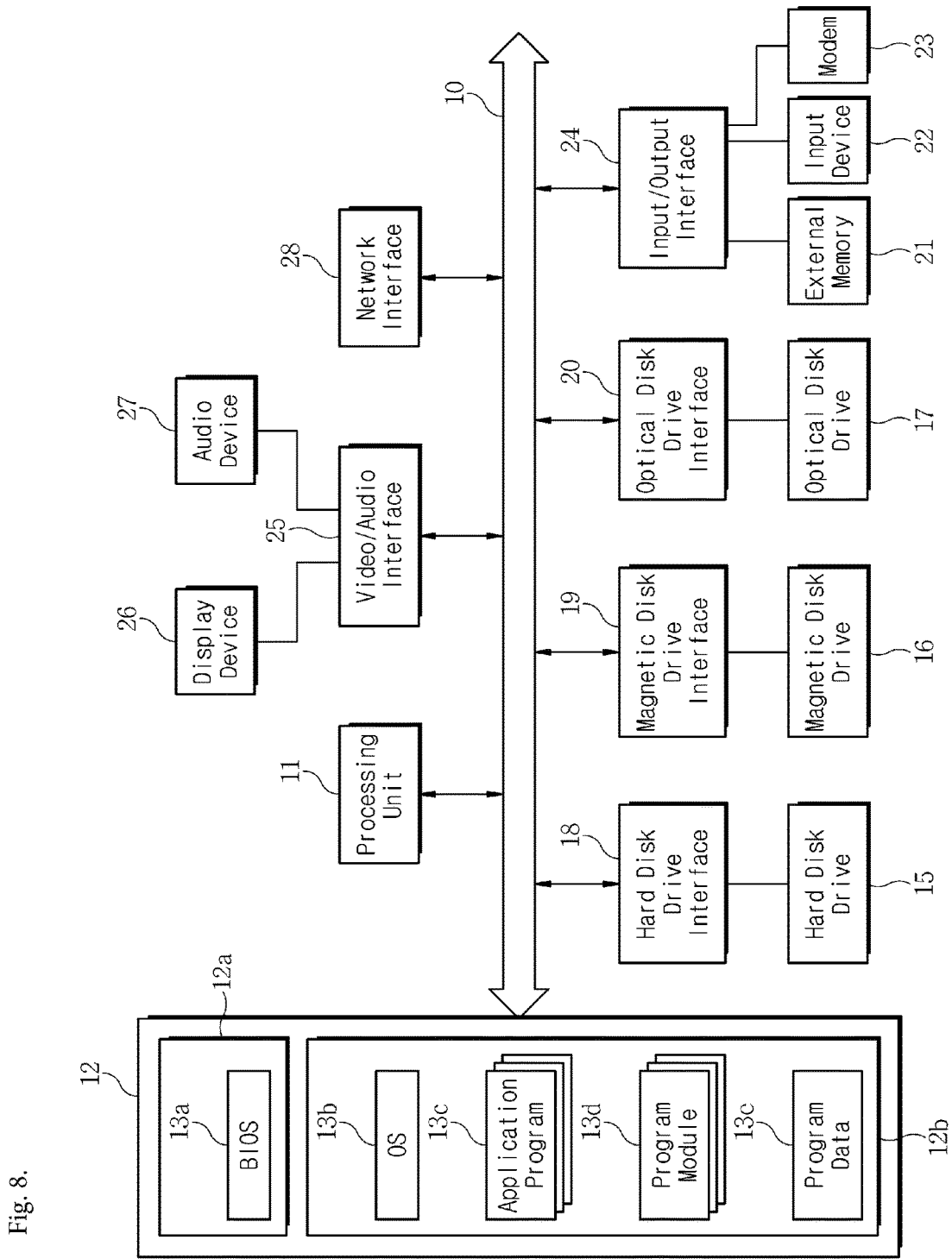
FIG. 8 is a diagram showing an operating environment of an apparatus for carrying out the authentication method for a wireless mesh network according to an embodiment of the present invention.

FIG. 8 is a diagram showing an operating environment of an apparatus for carrying out the authentication method for a wireless mesh network according to an embodiment of the present invention. In other words, FIG. 8 is a diagram illustrating an operating environment of the service device 400.

An appropriate computing environment in which the present invention may be implemented will be described simply and generally with reference to FIG. 8. It is not required but possible to describe the present invention in connection with to computer-executable instructions, such as program modules executed by a computer system.

In general, a program module includes a routine, a program, an object, a component, a data structure, etc. for performing a particular task or implementing a particular abstract data type. Computer-executable instructions, relevant data structures, and program modules are examples of program code means for performing operations of the present invention disclosed herein.

Referring to FIG. 8, an exemplary computer system for implementing the present invention includes a computing device including a processing unit 11, a system memory 12, and a system bus 10 which connects various system components including the system memory 12 to the processing unit 11.

The processing unit 11 may execute computer-executable instructions designed to implement characteristics of the present invention.

The system bus 10 may be a local bus, a peripheral bus, and a memory bus which use any one of various bus architectures, or any of some types of bus structures including a memory controller. The system memory 12 includes a ROM 12a and a RAM 12b. A basic input/output system (BIOS) 13a including a basic routine which helps to transmit information between the components of the computer system during boot up, etc. may be generally stored in the ROM 12a.

The computer system may include a storage means, for example, a hard disk drive 15 which reads information from a hard disk or records information in the hard disk, a magnetic disk drive 16 which reads information from a magnetic disk or records information in the magnetic disk, and an optical disk drive 17 which reads information from an optical disk, such as a CD-ROM or other optical media, or records information in the optical disk. The hard disk drive 15, the magnetic disk drive 16, and the optical disk drive 17 are connected to the system bus 10 through a hard disk drive interface 18, a magnetic disk drive interface 19, and an optical drive interface 20, respectively.

Also, the computer system may further include an external memory 21 as a storage means. The external memory 21 may be connected to the system bus 10 through an I/O interface 24.

The above-described drives and relevant computer-readable media on which reading and recording is performed by the drives provide non-volatile storage of computer-executable instructions, data structures, program modules, and other data. Although the exemplary environment described herein shows the hard disk 15, the magnetic disk 16, and the optical disk 17 as examples, it is also possible to use other types of computer-readable media for storing data including a magnetic cassette, a flash memory card, a DVD, a Bernoulli cartridge, a RAM, a ROM, and so on.

Program code means including one or more program modules including an OS 13b, one or more application programs 13c, other program modules 13d, and program data 13e which are loaded and executed by the processing unit 11 may be stored in the hard disk 15, the magnetic disk 16, the optical disk 17, the ROM 12a, or the RAM 12b.

Also, the computer system may receive a command and information from a user through an input device 22 such as a keyboard, a pointing device, a microphone, a joystick, a game pad, a scanner, and so on. This input device 22 may be connected to the processing unit 11 through the I/O interface 24 connected to the system bus 10. The I/O interface 24, for example, may logically represent not only any of a wide variety of different interfaces, such as a serial port interface, a personal system 2 (PS/2) interface, a parallel port interface, a universal serial bus (USB) interface, and an Institute of Electrical and Electronics Engineers (IEEE) 1394 interface (i.e., a FireWire interface), but also a combination of different interfaces.

In addition, the computer system to which the present invention is applied may further include a display device 26, such as a monitor or a liquid crystal display (LCD), and an audio device 27, such as a speaker or a microphone. These are connected to the system bus 10 through a video/audio interface 25. Other peripheral output devices (not shown), for example, a speaker and a printer, may be connected to the computer system. The video/audio interface 25 may include a high definition multimedia interface (HDMI), a graphics device interface (GDI), and so on.

Further, the computer system for performing the present invention may be connected to a network, such as an office- or enterprise-wide area computer network, a home network, an intranet, and/or the Internet. Through these networks, the computer system may exchange data with external sources, such as a remote computer system, a remote application, and/or a remote database.

To this end, the computer system to which the present invention is applied includes a network interface 28 which receives data from an external source and/or transmits data to the external source.

In the present invention, the computer system may exchange information with a device at a remote place through the network interface 28. For example, when the computer system denotes a first beacon device 200, it is possible to exchange information with the service device 400 through the network interface 28. On the other hand, when the computer system denotes the service device 400, it is possible to exchange information with a first beacon device 200 through the network interface 28. The network interface 28 may be represented by a logical combination of one or more software and/or hardware modules, such as a network interface card and the corresponding NDIS stack.

Likewise, the computer system receives data from an external source or transmits data to the external source through the I/O interface 24. The I/O interface 24 may be connected to a modem 23 (e.g., a standard modem, a cable modem, or a DSL modem), and may receive data from an external source and/or transmit data to the external source through the modem 23.

Although FIG. 8 shows an operating environment appropriate for the present invention, the principles of the present invention may be employed by any system which may implement the principles after appropriate modification as necessary. The environment shown in FIG. 8 is merely an example and represents only one of a wide variety of environments in which the principles of the present invention may be implemented.

Also, various types of information generated during execution of an authentication program for a wireless network according to the present invention may be stored and accessed in an arbitrary computer-readable medium related to the computer system shown in FIG. 8. For example, some of such program modules and some of relevant program data may be included in the OS 13b, the application programs 13c, the program modules 13d, and/or the program data 13e to be stored in the system memory 12.

When a mass storage device such as a hard disk is connected to the computer system, such program modules and relevant program data may be stored in the mass storage device. In a network environment, all or some of program modules related to the present invention may be stored in a system memory related to a remote computer system, for example, a computer system of the first beacon devices 200 and the service device 400, connected through the modem 23 of the I/O interface 24 or the network interface 28 and/or a remote memory storage device such as a mass storage device. As mentioned above, such modules may be executed in a distributed system environment.

As described above, this specification includes many particular implementation details. These particular implementation details are not meant to be construed as limitations on the scope of the invention or of what may be claimed, but rather as descriptions of features specific to particular embodiments of the invention. Certain features described in the context of separate embodiments may also be combined and implemented as a single embodiment.

Conversely, various features described in the context of a single embodiment can also be implemented in multiple embodiments separately or in any suitable sub-combinations. Moreover, although features may be described as acting in particular combinations and even initially claimed as such, one or more features from a combination as described or a claimed combination may in some cases be excluded from the combination, and the claimed combination may be directed to a sub-combination or a variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable those of ordinary skill in the art to implement and use the invention. This written description does not limit the invention to the precise terms set forth. Thus, while the invention has been described in detail with reference to the examples set forth above, those of ordinary skill in the art may effect alterations, modifications, and variations to the examples without departing from the scope of the invention.

Consequently, the scope of the present invention should be determined by the claims rather than the described embodiments.

What is claimed is:

1. A service device comprising:
   a communication circuit configured to communicate with one or more beacon devices or mobile communication terminals via a network, and to receive location information of a mobile communication terminal device mapped to a beacon device; and
   a control circuit configured to:
      set a particular spatial range as a criterion for forming a mesh network,
      set and store an authentication key required for accessing the mesh network,
      perform, when the beacon device attempts to access the mesh network, a first authentication operation including receiving an authentication key of the beacon device through the communication circuit and comparing the received authentication key with the stored authentication key to determine whether the received authentication key is identical to the stored authentication key,
      perform, when the received authentication key is identical to the stored authentication key, a second authentication operation including receiving location information of the beacon device through the communication circuit and determining, using the received location information as location information of the beacon device for the second authentication operation, whether a location of the beacon device is within the particular spatial range, and
      allow the beacon device to access the mesh network when the beacon device passes both the first authentication operation and the second authentication operation.

2. The service device of claim 1, wherein the communication circuit is further configured to receive the authentication key of the beacon device from a mobile communication terminal device mapped to the beacon device.

3. The service device of claim 1, wherein the communication circuit is further configured to receive the authentication key of the beacon device from the beacon device.

4. The service device of claim 1, wherein the communication circuit is further configured to receive identification information of the beacon device, and the received identification information contains the location information of the beacon device for the second authentication operation performed by the control circuit.

5. A non-transitory computer-readable recording medium storing a program for executing an authentication method for a wireless mesh network, the program, when executed by a service device, causing the service device to execute:
   an operation of setting a particular spatial range as a criterion for forming a mesh network;
   an operation of setting and storing an authentication key required for accessing the mesh network;
   an operation of receiving location information of a mobile communication terminal device mapped to a beacon device;
   a first authentication operation including receiving an authentication key of the beacon device and comparing the received authentication key with the stored authentication key to determine whether the received authentication key is identical to the stored authentication key, when the beacon device attempts to access the mesh network;
   a second authentication operation including receiving location information of the beacon device through the communication circuit and determining, using the received location information as location information of the beacon device whether a location of the beacon device is within the particular spatial range, when the received authentication key is identical to the stored authentication key; and
   allowing the beacon device to access the mesh network when the beacon device passes both the first authentication operation and the second authentication operation.

6. The non-transitory computer-readable recording medium of claim 5,
   wherein the first authentication operation includes receiving the authentication key of the beacon device from a mobile communication terminal device mapped to the beacon device.

7. The non-transitory computer-readable recording medium of claim 5,
   wherein the second authentication operation includes collecting location information of a mobile communication terminal device mapped to the beacon device attempting to access the mesh network.

8. The non-transitory computer-readable recording medium of claim 5,
   wherein the second authentication operation includes receiving identification information containing location information of the beacon device.

9. An authentication method for a wireless mesh network performed by a service device, the method comprising:
   perform an operation of setting a particular spatial range as a criterion for forming a mesh network;
   perform an operation of setting and storing an authentication key required for accessing the mesh network;
   establish communication with a beacon device;
   receive location information of a mobile communication terminal device mapped to the beacon device;
   perform a first authentication operation including receiving an authentication key of a beacon device and comparing the received authentication key with the stored authentication key to determine whether the received authentication key is identical to the stored authentication key, when the beacon device attempts to access the mesh network;
   perform a second authentication operation including receiving location information of the beacon device through the communication circuit and determining, using the received location information as location information of the beacon device whether a location of the beacon device is within the particular spatial range, when the received authentication key is identical to the stored authentication key; and
   allow the beacon device to access the mesh network when the beacon device passes through both the first authentication operation and the second authentication operation.

10. The authentication method of claim 9, wherein the first authentication operation includes receiving the authentication key from a mobile communication terminal device mapped to the beacon device.

11. The authentication method of claim 9, wherein the second authentication operation includes collecting location information of a mobile communication terminal device mapped to the beacon device attempting to access the mesh network.

12. The authentication method of claim 9, wherein the second authentication operation includes receiving identification information containing location information of the beacon device.

* * * * *